United States Patent
Leng et al.

(10) Patent No.: US 8,058,389 B2
(45) Date of Patent: *Nov. 15, 2011

(54) PROCESS FOR RECOVERING BROMINATED BUTADIENE POLYMERS FROM SOLUTION

(75) Inventors: Ronald B. Leng, Midland, MI (US);
Avani M. Patel, Midland, MI (US);
Brian D. Scherzer, Midland, MI (US);
Derrick G. Wetters, Bay City, MI (US);
Douglas C. Greminger, Midland, MI (US)

(73) Assignee: Dow Global Technologies LLC., Midland, MI (US)

( * ) Notice: Subject to any disclaimer, the term of this patent is extended or adjusted under 35 U.S.C. 154(b) by 723 days.

This patent is subject to a terminal disclaimer.

(21) Appl. No.: 12/146,636

(22) Filed: Jun. 26, 2008

(65) Prior Publication Data
US 2009/0008236 A1  Jan. 8, 2009

Related U.S. Application Data

(60) Provisional application No. 60/958,266, filed on Jul. 3, 2007.

(51) Int. Cl.
*C08F 6/00* (2006.01)
*C08J 3/00* (2006.01)

(52) U.S. Cl. ............ 528/500; 203/45; 525/54; 525/355; 525/356; 525/359.1

(58) Field of Classification Search .................... 203/45; 525/54, 355, 356, 359.1; 528/500
See application file for complete search history.

(56) References Cited

U.S. PATENT DOCUMENTS

| | | | |
|---|---|---|---|
| 3,804,145 A | 4/1974 | Arnold | |
| 4,568,418 A | 2/1986 | Walko | |
| 5,317,083 A | 5/1994 | Freitag | |
| 5,475,084 A | 12/1995 | Okamoto | |
| 5,615,831 A | 4/1997 | Molezzi | |
| 7,674,862 B2 * | 3/2010 | Gorman | 525/355 |

FOREIGN PATENT DOCUMENTS

| | | |
|---|---|---|
| WO | WO2008/021417 | 2/2008 |
| WO | WO2008/021418 | 2/2008 |

* cited by examiner

*Primary Examiner* — Terressa Boykin
(74) *Attorney, Agent, or Firm* — Gary C. Cohn PLLC

(57) ABSTRACT

Brominated polybutadiene polymers are recovered from a bromination reaction solution by forming the solution into droplets, thermally stripping the solvent from the droplets, and then washing the resulting particles. The washed particles are then recovered from the washing liquid. The droplets can be dispersed into a gaseous medium such as air and then transferred into a nonsolvent liquid for washing, or can be formed directly into the nonsolvent liquid. The process forms a particulate polymer material that is easily filterable and has low levels of volatile impurities and inorganic salts. Brominated polybutadiene polymers recovered in this manner are often very thermally stable.

15 Claims, No Drawings

PROCESS FOR RECOVERING BROMINATED BUTADIENE POLYMERS FROM SOLUTION

This application claims priority from U.S. Provisional Application No. 60/958,266, filed 3 Jul. 2007.

The present invention relates to a process for recovering a brominated butadiene polymer from solution.

Brominated butadiene polymers are candidates for replacing hexabromocyclododecane as a flame retardant (FR) additive in various polymer systems. These brominated polymers are often made by brominating a polybutadiene precursor (which may be a polybutadiene homopolymer but more typically is a block copolymer of butadiene and a vinyl aromatic monomer such as styrene). The bromination reaction is typically conducted in solution. A number of different brominating agents can be used, including elemental bromine and various ammonium tribromide compounds. The brominated polymer then must be recovered from the reaction solution and blended into the polymer system in which it will be used. This is commonly done by adding an organic antisolvent to precipitate the brominated polymer from solution and then filtering, washing and drying the brominated polymer. Some reaction by-products tend to remain with the reaction solvent, and so the brominated polymer is purified somewhat using this method, at the same time as it is recovered from the reaction solvent. Other by-products, such as inorganic salts, tend to precipitate or leach into the antisolvent with the brominated polymer. This technique has the drawbacks of high capital and operating costs, because large volumes of antisolvent must be handled, recovered and recycled.

To be a suitable FR additive, the brominated butadiene polymer must possess sufficient thermal stability to undergo very little, if any, thermal degradation when subjected to melt processing conditions, during which the FR additive may be exposed to temperatures approaching 250° C. or even higher. One way of evaluating the thermal stability of the brominated butadiene polymer is a thermogravimetric method, in which the candidate material is heated while monitoring its weight. The temperature at which the material has lost 5% of its starting weight (5% weight loss temperature, or 5% WLT) is a good indication of the thermal stability of the material. By careful selection of bromination conditions, brominated butadiene polymers can be produced that have 5% WLT values in excess of 240° C. However, even better thermal stability is desired.

It would be desirable to provide a method by which a brominated butadiene polymer can be recovered from a crude reaction solution efficiently and cost effectively. The method preferably permits the brominated butadiene polymer to be recovered in the form of a particulate solid that preferably is easily filtered. Even more preferably, the method produces a highly thermally stable brominated butadiene polymer with very low levels of ionic impurities.

The present invention is in one aspect a process for recovering a brominated butadiene polymer from a crude reaction solution, comprising (1) forming the solution into fine droplets, (2) thermally stripping the solvent from the droplets to form particles of the brominated butadiene polymer, (3) prior to, during or after step (2), washing said droplets or particles in a nonsolvent liquid and then (4) separating the particles from the nonsolvent liquid.

The present invention is in another respect a process for recovering a brominated butadiene polymer from a crude reaction solution, comprising forming droplets of the solution in a nonsolvent liquid, heating the droplets to remove solvent and form a dispersion of particles of the brominated butadiene polymer in the nonsolvent liquid, and then removing the brominated butadiene polymer particles from the nonsolvent liquid.

The present invention is in still another respect a process for recovering a brominated butadiene polymer from a crude reaction solution, comprising forming droplets of the solution, contacting the droplets with steam and removing a mixture of vaporized solvent and water from the droplets to form particles of the brominated butadiene polymer, washing the particles in liquid water, and then separating the particles from the water.

In yet another respect, the present invention is a process for recovering a brominated butadiene polymer from a crude reaction solution, comprising (a) forming a dispersion of droplets of the solution in a continuous aqueous phase, (b) heating the dispersed droplets with steam to remove solvent from the droplets and form particles of the brominated butadiene polymer dispersed in said continuous aqueous phase, (c) withdrawing a mixed vapor of solvent and water from the dispersion, and (d) then separating the particles from the continuous aqueous phase.

Further, in some embodiments the present invention is a process for recovering a brominated butadiene polymer from a crude reaction solution, comprising dispensing steam and the crude reaction solution through a nozzle such that droplets of the butadiene polymer solution are formed and at least a portion of the solvent is removed from the droplets to form brominated butadiene polymer particles, dispersing the brominated butadiene polymer particles in water, and then separating the brominated butadiene polymer particles from the water.

This process is a cost-effective, efficient method for recovering the brominated butadiene polymer from a crude reaction solution. The method also provides a direct means for recovering the brominated polymer in the form of a particulate solid. Because of this, subsequent sizing steps such as grinding or cutting the brominated polymer can be reduced or avoided. In most cases, the particles are easily filtered, and so can be easily separated from the nonsolvent liquid. The particulate nature of the product facilitates the use of the polymer in downstream operations, as particles are a convenient form for combining the brominated polymer with another polymer to make blends. The process can also produce a brominated butadiene polymer having low levels of impurities, and in particular low levels of inorganic salts such as bromides and sulfates. Brominated butadiene polymers recovered by the process often have very good thermal stability. The brominated polymers can exhibit 5% weight loss temperatures, determined according to the TGA method described below, of 250° C. or more.

The present process starts with a crude reaction solution containing the brominated polybutadiene polymer (as described more fully below), a solvent and reaction by-products of various types, the nature of which will depend on the particular bromination process that is used. The crude reaction solution may contain other materials as well, including unreacted starting materials and/or other components which may be present in the reaction mixture for various reasons.

The selection of solvent is determined by the particular butadiene starting polymer and the particular bromination process that is used. Suitable solvents include ethers such as tetrahydrofuran; halogenated alkanes such as carbon tetrachloride, chloroform, dichloromethane and 1,2-dichloroethane; hydrocarbons such as cyclohexane and toluene, and halogenated aromatic compounds such as bromobenzene, chlorobenzene and dichlorobenzene. Preferred solvents have boiling temperatures (at atmospheric pressure) of less than 100° C. (especially less than 80° C.), are substantially immiscible in water, are aprotic, and do not contain either hydrogen atoms bonded to a tertiary carbon atom or oxygen. Especially preferred solvents are more volatile than water, and are thus easily removed from water. Halogenated alkanes, cyclic alkanes that contain no hydrogen atoms bonded to a tertiary carbon atom and halogenated aromatic compounds are particularly preferred solvents. Two especially preferred solvents are dichloroethane and cyclohexane.

One crude reaction solution of particular interest is that formed in the reaction of a starting copolymer of butadiene and at least one vinyl aromatic monomer with elemental bromine in a non-oxygenated solvent and in the presence of a $C_1$-$C_8$ alkanol. The solvent is preferably a halogenated alkane, a cyclic alkane that contains no hydrogen atoms bonded to a tertiary carbon atom and/or halogenated aromatic compound as described before. Another crude reaction solution of particular interest is that formed in the reaction of a starting copolymer of butadiene and at least one vinyl aromatic monomer with pyridinium tribromide, phenyltrimethylammonium tribromide or a tetraalkylammonium tribromide in the presence of a solvent for the tribromide, particularly a halogenated alkane, a cyclic alkane having no hydrogen atoms bonded to a tertiary carbon atom, and/or halogenated aromatic compound as described before. In each case, the crude reaction solution will contain impurities such as unreacted starting materials and reaction by-products. Bromide and sulfate salts are common impurities in these crude reaction solutions.

The crude reaction solution is formed into droplets and heated to drive off solvent. As the solvent is removed, the butadiene polymer will precipitate and particles will form. Enough of the solvent is removed to cause the butadiene polymer to precipitate. Preferably enough solvent is removed such that the polymer particles contain no more than 5%, more preferably no more than 1% and even more preferably no more than 0.25% by weight of solvent. For purposes of this invention, "essentially all" of the solvent is considered to have been removed if the polymer particles contain no more than 1% solvent by weight. The particles obtained in this manner are washed in a fluid medium in which the particles are insoluble. These steps can be performed in a number of different ways. In some cases, two or more of these steps can be performed simultaneously.

Various embodiments of the invention can be broadly characterized by the manner in which the droplets are formed. In certain embodiments, the droplets are formed by dispersing the reaction solution into a nonsolvent liquid. In other embodiments, the droplets are first formed and then transferred (before or after removing the solvent) into a nonsolvent liquid.

Dispersion of Droplets into a Nonsolvent Liquid

In these embodiments, the crude reaction mixture is dispersed directly into a nonsolvent liquid to form droplets. The nonsolvent liquid forms a continuous phase. This is conveniently done by bringing the crude reaction mixture and the nonsolvent liquid together and imparting shear to the mixture. A wide variety of apparatus can be used, the selection of which is generally not considered to be critical to the invention. A stirred vessel is suitable, provided that sufficient agitation is provided to shear the crude reaction mixture into droplets. Alternatively, the crude reaction mixture can be fed into the nonsolvent liquid in the form of droplets, in which case the fluid medium should be agitated in order to minimize coalescence of the droplets. The agitation may serve to re-size the droplets into smaller droplets if desired. A single-fluid nozzle is a suitable device for introducing droplets of the crude reaction mixture into a nonsolvent liquid.

In these embodiments of the invention, the nonsolvent liquid is a material that (1) is liquid at the operating temperatures and pressures, (2) is immiscible with the solvent present in the crude reaction mixture, (3) is not a solvent for the brominated polybutadiene polymer and (4) is less volatile than the solvent present in the crude reaction mixture. The nonsolvent liquid may be a mixture of materials. It may be an organic liquid, but by far the most preferred nonsolvent liquid is water.

For purposes of this invention, a nonsolvent liquid is considered to be a "liquid at the operating temperatures and pressures" if its boiling temperature at the pressure used in the process is at or below the operating temperature.

The solvent is considered to be immiscible in the nonsolvent liquid if it is not soluble at all in the nonsolvent liquid, or if it is soluble to the extent of 5 weight percent (5 parts solvent per 100 parts fluid medium) or less. The solvent preferably is soluble to the extent of no more than 1 weight percent in the nonsolvent liquid.

Similarly, the nonsolvent liquid is considered for purposes of this invention not to be a solvent for the brominated polybutadiene polymer if the brominated polybutadiene polymer is not soluble at all in the nonsolvent liquid, or if it soluble to the extent of 5 weight percent (5 parts solvent per 100 parts fluid medium) or less. The brominated polybutadiene preferably is soluble to the extent of no more than 0.5 weight percent in the nonsolvent liquid.

The dispersed droplets are then heated to a temperature sufficient to thermally drive the solvent from droplets. This is conveniently done by heating the entire dispersion to the necessary temperature. If desired, the nonsolvent liquid can be brought to the necessary temperature before the crude reaction solution is dispersed into it. Alternatively or in addition, the droplets can be dispersed first, and the entire dispersion then brought to the needed temperature. It is also possible to provide only localized heating at or near the location of the droplets in order to heat them to the needed temperature without heating the entire dispersion.

The temperature used to drive off the solvent is at least the boiling temperature (at the particular pressure conditions used during this step) of the solvent. If the solvent forms an azeotrope with the fluid medium, the temperature in that case should be at least the temperature at which the azeotrope boils (again, at the particular pressure conditions employed). In especially preferred embodiments, the temperature is below the glass transition temperature ($T_g$) of the brominated butadiene polymer after the solvent has been removed from it (i.e., that of the neat polymer after the solvent has been removed). To some extent, operating pressures can be adjusted to raise or lower the operating temperature that is needed to remove the solvent. For example, running the process at subatmospheric pressures can allow a lower operating temperature to be used, as the solvent will have a lower boiling temperature at the lower operating pressure.

A preferred way of heating the dispersion is to introduce a hot gas below the surface of the dispersion. The gas can be any gas which does not react with the brominated polybutadiene polymer (and preferably not with the solvent or the nonsolvent liquid, either). The gas may be air, nitrogen, argon, helium or steam. Steam is especially preferred on the basis of its thermodynamic properties and cost, especially when the nonsolvent liquid is water. In addition to providing heat, the subsurface introduction of the hot gas provides additional energy for dispersing the crude reaction mixture into droplets and/or keeping the droplets dispersed.

In an especially efficient process, the nonsolvent liquid is held in an agitated vessel, and the crude reaction solution and steam are both introduced below the surface of the nonsolvent liquid. The two fluids preferably are introduced simultaneously, and spatially close to each other. This permits the hot gas to supply energy for breaking the crude reaction solution into droplets and provides for rapid heating of the droplets. Even more preferably, the two fluids are introduced not only simultaneously and spatially close to each other, but also at a high shear region of the vessel, such as near the tip of an agitator. Again, this arrangement favors rapid dispersal of the crude reaction solution into droplets and efficient heating of the droplets.

The supplied heat causes the solvent in the droplets to volatilize, and the volatilized solvent is then removed from the system. Because the droplets are dispersed in a nonsolvent liquid, the volatilized solvent must first enter the nonsolvent liquid and pass through it before it can be removed from the system. Various gas-liquid separation techniques can be used to separate the volatilized solvent from the nonsolvent liquid, but the simplest approach is to provide a head space into which the solvent can pass. The head space is maintained at temperature and pressure conditions sufficient that the vaporized solvent does not condense and re-enter the liquid phase.

In an alternate embodiment, the temperature of the nonsolvent liquid can be raised to its boiling temperature (at the given operating pressure), so a portion of the nonsolvent liquid is vaporized at the same time as the solvent. The vaporized nonsolvent liquid aids in removal of residual solvent from the particles in the same manner as addition of a hot gas. In this embodiment, heat to vaporize the portion of the nonsolvent liquid may be applied internally (such as by introducing subsurface steam as described above,) or externally.

Shear is applied to the droplets during the solvent removal step, in order to keep the droplets from coalescing into large masses as the solvent is removed. Some agglomeration of the droplets to form small agglomerated particles often occurs and can be tolerated provided that the agglomerated particles produced in this way are small enough to form a powder or finely granulated material.

As solvent is removed from the dispersed droplets, the brominated polybutadiene polymer will precipitate from the solution. The particles at first tend to be soft and solvent-laden. As more of the solvent is removed, the particles tend to become harder and often smaller in diameter due to the loss of the solvent. The glass transition temperature ($T_g$) of the particles usually will increase as solvent is removed, until essentially all the solvent is removed and the $T_g$ of the particles becomes that of the neat brominated butadiene polymer As long as the particles are at a temperature above their $T_g$, they will be somewhat tacky and have a tendency to congeal. On the other hand, particles which are at a temperature below their $T_g$ will have little or no tendency to congeal if removed from the nonsolvent liquid. In that case, the particles can be immediately separated from the nonsolvent liquid and recovered, typically by filtration.

Therefore, if the temperature is above the $T_g$ of the brominated butadiene polymer particles, the particles should be cooled to below their $T_g$ before separating them from the nonsolvent liquid, in order to keep them from congealing into large masses. Shear should continue to be applied to the particles until they have been brought to a temperature below their $T_g$, again to minimize coagulation of the droplets. It is possible to permit some agglomeration of the particles to occur in controlled fashion before cooling them below their $T_g$, if it is desirable to product a larger particle size, but in this case, the particles should still take the form of a powder or granular material.

In embodiments in which the droplets are dispersed directly into the nonsolvent liquid, washing occurs simultaneously with the dispersing step and solvent volatilization step. Materials present in the crude reaction mixture that are soluble in the nonsolvent liquid will at least partially leach out into the nonsolvent liquid. Volatile materials tend to be removed with the solvent. If desired, washing can be continued after the solvent has been removed by keeping the particles in contact with the nonsolvent liquid, preferably with application of agitation or another form of shear. It is also within the scope of the invention to recover the particles and then subject them to one or more additional washing steps.

Once the particles have been washed and cooled below the $T_g$ of the neat brominated butadiene polymer, they can be separated from the nonsolvent liquid. The method of separation is not particularly important, provided that the particles do not significantly coalesce or clump together to form large agglomerates. Filtration methods are entirely suitable. In most cases, it has been found that the particles filter easily from the nonsolvent liquid. Filtration can be done batch-wise or continuously, using a variety of equipment that is readily available. Centrifugation methods are also useful, as are spray-drying techniques.

The recovered solids can be washed again one or more times if desired, and can be dried by application of heat and/or vacuum. Any heating step should not subject the particles to temperatures at or above their $T_g$ (unless the particles are agitated) to help prevent the particle from congealing into a large mass.

Dispersion of Droplets into a Gaseous Medium

Another way of forming the droplets of the crude reaction solution is to form the solution into droplets which are dispersed in a gaseous medium. This method is particularly amenable to continuous processes. The droplets thus formed are then dispersed into a nonsolvent liquid, either before or after the solvent is removed from them, where they are washed and from which brominated butadiene polymer particles are recovered.

Droplets can be formed in a gaseous medium using various spraying and atomization techniques. Devices such as nozzles and atomizers that are designed to form fine mists or sprays are suitable. Single-fluid nozzles can be used if desired. Nozzles of this type bring only a single fluid (the crude reaction solution) to the nozzle tip, where it is sprayed into the gaseous medium. Two-fluid nozzles are also useful, and are preferred in certain embodiments of the invention. In a two-fluid nozzle design, the crude reaction solution and a second fluid (typically a gas), are brought separately to the nozzle tip, where they are combined and sprayed. The second fluid provides energy that is used to disperse the crude reaction mixture into droplets and eject it from the nozzle. Suitable two-fluid nozzles are commercially available from sources such as Spraying Systems, Inc., Wheaton, Ill. USA. The size distribution of droplets produced by a two-fluid nozzle can be changed by changing the relative rates at which the atomizing gas (and any shroud gas as described below) and crude reaction solution are sprayed. A higher amount of atomizing gas tends to lead to a smaller particle size distribution. This may be due to faster removal of the solvent from the droplets, which reduces their volume and also reduces their tendency to agglomerate by reducing their $T_g$. The particle size distribution of the polymer particles is often larger than the droplets produced by the two-fluid nozzle, which may be due to a certain amount of agglomeration of the droplets. As before, this is acceptable if the particles retain the form of a powder or granular material.

In some embodiments, essentially all of or part of the solvent is volatilized from the sprayed droplets while the droplets are in the gaseous medium. In such embodiments, the droplets are brought to a temperature sufficient to volatilize essentially all of or part of the solvent from them, at the same time that the droplets are dispersed in the gaseous medium. The temperature used to drive off the solvent is at least the boiling temperature (at the particular pressure conditions used during this step) of the solvent. As before, it is preferred, but not necessary, that the temperature is below the glass transition temperature ($T_g$) of the neat brominated butadiene polymer.

The needed heat can be supplied by heating the gaseous medium, by heating the crude reaction solution prior to forming the droplets, or by heating the droplets. A preferred way of heating the droplets in this embodiment is to use a hot gas to heat and atomize the crude reaction fluid. The hot gas is preferably used as a second fluid in a two-fluid nozzle as described before. If it is desired to evaporate more solvent from the droplets than the thermal energy of the atomizing gas can supply, additional hot gas can be supplied around the nozzle tip to from a shroud of additional hot gas. Surprisingly, if this additional shroud gas is supplied at low velocity, the size distribution of the droplets produced by the two-fluid nozzle is not affected. As before, the hot shroud gas can be any gas which does not react with the brominated polybutadiene polymer, including air, nitrogen, argon, helium or steam. As before, steam is especially preferred.

As described before, removal of the solvent will cause the brominated butadiene polymer to precipitate. Depending on temperature, the precipitated polymer may form rubbery particles (if at a temperature above the $T_g$ of the particles) or form non-sticky particles (if at a temperature below the $T_g$ of the particles). The $T_g$ of these partially-precipitated particles will depend on the amount of residual solvent contained by the particles. High levels of residual solvent can lower the effective $T_g$ of the polymer, making them rubbery at temperatures at which the solvent-free particles would be non-sticky. The precipitation can occur while the particles are dispersed in the gaseous medium, if enough of the solvent is removed. Alternatively, if only a portion of the solvent is removed before the droplets are dispersed in the nonsolvent liquid, the brominated butadiene polymer may not precipitate until the droplets or particles have been dispersed into the nonsolvent liquid and more of the solvent is removed.

If the droplets are dispersed into the nonsolvent liquid prior to volatilizing the solvent from them, the solvent is then removed from the droplets while they are dispersed in the nonsolvent liquid. This can be done in the same way as in the case where the droplets are formed directly in the nonsolvent liquid, as described before.

If the brominated butadiene polymer particles are at a temperature above their $T_g$ at the time they are dispersed in the nonsolvent liquid, the particles are then cooled to below their $T_g$ in the nonsolvent liquid before being recovered from the nonsolvent liquid. This is most conveniently done by maintaining the temperature of the nonsolvent liquid below the $T_g$ of the neat brominated butadiene polymer. The operating pressure of the system may be controlled such that the boiling point of the nonsolvent liquid is below the $T_g$ of the neat brominated polymer.

Washing occurs while the droplets and/or particles are dispersed in the nonsolvent liquid. When droplets of the crude reaction mixture are formed in a gaseous phase, the nonsolvent liquid is a material that (1) is liquid at the operating temperatures and pressures and (2) is not a solvent for the brominated polybutadiene polymer. If essentially all of the solvent is not removed from the droplets before they are dispersed in the nonsolvent liquid, then the nonsolvent liquid also (3) should be immiscible with the solvent present in the crude reaction mixture, and (4) be less volatile than the solvent present in the crude reaction mixture. As before, the nonsolvent liquid may be a mixture of materials. Also as before, it may be an organic liquid, but by far the most preferred nonsolvent liquid is water.

If essentially all the solvent is not removed from the droplets while they are dispersed in the gaseous phase, it is necessary to remove the remaining solvent from the droplets after they become dispersed in the nonsolvent liquid. This can be done in the same manner as described before. As before, the dispersion should be kept under conditions of shear until the brominated butadiene polymer precipitates and is brought to a temperature below its $T_g$. The particles are then separated from the nonsolvent liquid as described before, and recovered as an easily-filtered solid.

As before, components of the reaction mixture that are soluble in the nonsolvent liquid will tend to leach out into it during the washing step. Also as before, volatile impurities in the crude reaction mixture tend to become volatilized at the same time that the solvent is removed from the droplets.

Specific Methods

A batch or continuous embodiment of the invention uses a stirred reactor that contains the nonsolvent liquid. A head space is provided above the surface of the nonsolvent liquid. At least one outlet is provided for removing volatilized solvent from the reactor. The nonsolvent liquid is stirred using an agitator blade, and heated to the desired volatilization temperature. If desired, a vacuum is provided in the head space. The solution of brominated butadiene polymer is then introduced below the surface of the nonsolvent liquid. It is preferably introduced through a dispersing mechanism which produces droplets of the solution. The solution is preferably introduced in a high shear zone of the reaction vessel, which commonly corresponds to a region near the tip of an agitator blade. This facilitates rapid mass transfer of solvent from the droplets to the nonsolvent liquid. A hot gas, preferably steam, is introduced subsurface to provide additional shear and heat to thermally drive off the solvent. The hot gas is preferably introduced close to the point where the brominated butadiene polymer solution droplets are introduced. Solvent is removed overhead and collected, where it can be recycled as desired. Soft, solvent-rich particles of the brominated butadiene polymer form as the first part of the solvent is removed. Upon addition of all of the polymer solution, hot gas addition is continued, as is agitation, until the distillate temperature approaches the reactor internal temperature, indicating that essentially all of the solvent has been removed. At this point, the hot gas addition can be discontinued, and the overhead pressure equilibrated to atmospheric pressure if necessary. If the temperature of the nonsolvent liquid is above the $T_g$ of the neat brominated butadiene polymer, the nonsolvent liquid and the particles are then cooled below that $T_g$ to form non-tacky particles. It may be desirable to cool the nonsolvent liquid in any case, in order to conduct subsequent steps at lower operating temperatures. The nonsolvent liquid is then filtered to remove the polymer particles, which can be washed with more of the nonsolvent liquid. The particles can then be dried, using with heat supplied directly or indirectly. Subatmospheric pressure may be used during the drying step. The particles should not be heated above the $T_g$ of the neat brominated butadiene polymer during any drying step unless some means such as mechanical agitation is provided, in order to prevent the sticky particles from congealing. Filtering can be done by removing the dispersion from the reactor and transferring it to any suitable filtering apparatus, such as a continuous belt filter. Drying can be done continuously if desired using apparatus such as a continuous tray dryer.

In another embodiment, the droplets of solution of the brominated polybutadiene polymer are formed in or fed into a vessel, where the solvent is flashed off. Heat for vaporization is provided by the introduction of hot gas (steam is again preferred), which may be fed separately or together with the polymer solution, as through a two-fluid nozzle. The droplets are captured in nonsolvent liquid in the vessel. The preferred nonsolvent liquid is water. A vapor containing the solvent and optionally water is withdrawn from the head space of the vessel whereupon it is condensed. With a preferred solvent, the liquid solvent and liquid water will phase separate so that they can be separated in a continuous decanting receiver. The aqueous phase can be recycled to the vessel, and the solvent can be recycled for use in subsequent reactions to produce more of the brominated polymer. A draw of polymer particles in the nonsolvent liquid is removed intermittently or continuously and fed to a filtration device such as a continuous belt filter. The belt filter may be vacuum assisted. A portion of the filtrate is purged to provide an outlet for dissolved impurities, and the remainder is recycled to the vessel. The filtered polymer particles may be washed again one or more times, and dried as before if desired.

In another embodiment, a multi-stage slurry stripper is used as the precipitation vessel. The stripper contains two or more separate agitated slurry vessels. In a two-stage system, for example, droplets of the polymer solution are formed in the first vessel. Steam is sparged into the second vessel, and the steam exhaust from this vessel is used to strip the first vessel, which contains particles that have a higher residual solvent level. The polymer slurry from the second vessel is continuously or intermittently removed and sent downstream for filtration and further processing. The polymer slurry from the first vessel is continuously or intermittently removed and sent the second vessel for removal of additional residual solvent. At the same time, additional slurry is being formed in the first vessel through the addition of nonsolvent liquid, polymer solution and steam. As the first vessel becomes filled and the second vessel becomes emptied, the flows are changed so that the roles of the two vessels become reversed.

The brominated butadiene polymer is a homopolymer or copolymer of butadiene, which has been brominated at the sites of aliphatic carbon-carbon unsaturation. Preferably, the brominated butadiene polymer is a brominated copolymer of butadiene and one other comonomer, and has a glass transition temperature of at least 80° C., more preferably at least 100° C. and even more preferably at least 105° C. A preferred type of butadiene polymer is a random, block or graft copolymer of butadiene and at least one vinyl aromatic monomer. A "vinyl aromatic" monomer is an aromatic compound having a polymerizable ethylenically unsaturated group bonded directly to a carbon atom of an aromatic ring. Vinyl aromatic monomers include unsubstituted materials such as styrene and vinyl naphthalene, as well as compounds that are substituted on the ethylenically unsaturated group (such as, for example alpha-methylstyrene), and/or are ring-substituted. Ring substituted vinyl aromatic monomers include those having halogen, alkoxyl, nitro or unsubstituted or substituted alkyl groups bonded directly to a carbon atom of an aromatic ring. Examples of such ring-substituted vinyl aromatic monomers include 2- or 4-bromostyrene, 2- or 4-chlorostyrene, 2- or 4-methoxystyrene, 2- or 4-nitrostyrene, 2- or 4-methylstyrene and 2,4-dimethylstyrene. Preferred vinyl aromatic monomers are styrene, alpha-methyl styrene, para-methyl styrene, and mixtures thereof.

The butadiene polymer suitably contains at least 10% by weight of polymerized butadiene.

Butadiene polymerizes to form two types of repeating units. One type, referred to herein as "1,2-butadiene units" takes the form

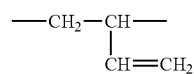

and so introduces pendant unsaturated groups to the polymer. The second type, referred to herein as "1,4-butadiene" units, takes the form —CH$_2$—CH=CH—CH$_2$—, introducing unsaturation into the main polymer chain. The butadiene polymer preferably contains at least some 1,2-butadiene units prior to bromination. Of the butadiene units in the butadiene polymer prior to bromination, at least 10%, preferably at least 15% and more preferably at least 20% and even more preferably at least 25%. are 1,2-butadiene units. 1,2-butadiene units may constitute at least 50%, at least 55%, at least 60% or at least 70% of the butadiene units in the polymer prior to bromination. The proportion of 1,2-butadiene units may be in excess of 85% or even in excess of 90% of the butadiene units in the polymer before bromination.

Brominated styrene/butadiene block copolymers are especially preferred. Unbrominated styrene/butadiene block copolymers that are useful starting materials are widely available in commercial quantities. Those available from Dexco Polymers under the trade designation VECTOR™ are suitable.

The brominated butadiene polymer may also contain repeating units formed by polymerizing monomers other than butadiene and a vinyl aromatic monomer. Such other monomers include olefins such as ethylene and propylene, acrylic or acrylate monomers such as methyl methacrylate, methyl acrylate, acrylic acid, and the like. These monomers may be randomly polymerized with the vinyl aromatic monomer and/or butadiene, may be polymerized to form blocks, or may be grafted onto the butadiene polymer.

The brominated butadiene polymer has a weight average molecular weight (Mw) within a range of from 1,000 to 400,000, preferably from 2,000 to 100,000, more preferably from 5,000 to 100,000 and even more preferably, at least from a commercial availability point of view, from 50,000 to 175,000. For purposes of this invention, molecular weights are apparent molecular weights as measured by gel permeation chromatography (GPC), relative to a polystyrene standard. GPC molecular weight determinations can be performed using an Agilent 1100 series liquid chromatograph equipped with two Polymer Laboratories PLgel 5 micrometer Mixed-C columns connected in series and an Agilent G1362A refractive index detector (or equivalent device), with tetrahydrofuran (THF) flowing at a rate of 1 ml/min and heated to a temperature of 35° C. as the eluent.

The most preferred type of brominated butadiene polymer is a block copolymer containing one or more polystyrene blocks and one or more polybutadiene blocks, in which at least 50%, more preferably at least 70% and even more preferably at least 85% of the butadiene repeating units have been brominated. Among these, block copolymers having a central brominated polybutadiene block and terminal polystyrene blocks are especially preferred.

The process of the invention tends to produce brominated butadiene polymers that are highly purified. Volatile impurities in the starting solution tend to be removed with the solvent, whereas ionic impurities tend to be removed during the washing step(s) and remain with the nonsolvent liquid. The high purity of the product is sometimes reflected in its thermal stability. A useful indicator of thermal stability is a 5% weight loss temperature, which is measured by thermogravimetric analysis as follows: 10 milligrams of the polymer is analyzed using a TA Instruments model Hi-Res TGA 2950 or equivalent device, with a 60 milliliters per minute (ml/min) flow of gaseous nitrogen and a heating rate of 10° C./min over a range of from room temperature (nominally 25° C.) to 600° C. The mass lost by the sample is monitored during the heating step, and the temperature at which the sample has lost 5% of its initial weight is designated the 5% weight loss temperature (5% WLT). This method provides a temperature at which a sample undergoes a cumulative weight loss of 5 wt %, based on initial or starting sample weight. The brominated butadiene polymer preferably exhibits a 5% WLT of at least 200° C. The 5% WLT is preferably at least 220° C., more preferably at least 230° C., even more preferably at least 240° C., and still more preferably at least 250° C. Brominated butadiene polymers in which at least 85% of the butadiene units have been brominated, and which have such 5% WLT values, are of particular interest.

The starting solution may contain one or more additives that are less volatile than the nonsolvent liquid and which are not soluble in the nonsolvent liquid. These additives will remain with the brominated butadiene polymer through the process, such that the particulate product will contain a quantity of the additive(s) as well as the brominated polybutadiene polymer. The additive may be any that is useful in conjunction with the brominated butadiene polymer. The additive may be, for example, a coupling agent, an antioxidant, a plasticizer, a mold release agent, a biocide, a coloring agent or other useful additive. The additive may be another organic polymer, in which case polymer blends are formed. Any such organic polymer should be miscible with the brominated butadiene polymer in the relative proportions that are present. Such an organic polymer should also have a glass transition temperature that is higher the boiling temperature of the nonsolvent liquid at the pressure in the dispersion vessel, so solid, non-tacky particles are formed.

It is also within the scope of the invention to simultaneously disperse droplets of a second polymer into the fluid medium, remove the solvent from the droplets and precipitate the second polymer simultaneously with the brominated butadiene polymer. This forms blends of particles of the brominated butadiene polymer and particles of the second polymer. Alternatively, the second polymer particles can be formed separately and then blended with the particles of the brominated butadiene polymer.

The brominated butadiene polymer is useful as a flame retardant additive for a variety of organic polymers. Organic polymers of interest include vinyl aromatic or alkenyl aromatic polymers (including alkenyl aromatic homopolymers, alkenyl aromatic copolymers, or blends of one or more alkenyl aromatic homopolymers and/or alkenyl aromatic copolymers), as well as other organic polymers in which the brominated butadiene polymer is soluble or can be dispersed to form domains of less than 10 micrometers (μm), preferably less than 5 μm, in size. Enough of the brominated butadiene polymer is preferably present in the blend to provide the blend with a bromine content within a range of from 0.1 percent by weight to 25 percent by weight, based upon blend weight.

Blends of the brominated butadiene polymer may include other additives such as flame retardant additives, flame retardant adjuvants, thermal stabilizers, ultraviolet light stabilizers, nucleating agents, antioxidants, foaming agents, acid scavengers and coloring agents.

The following examples are provided to illustrate the invention, but not to limit the scope thereof. All parts and percentages are by weight unless otherwise indicated.

EXAMPLE 1

1027 g of water and 250 g of a 10% solution of a brominated styrene/butadiene/styrene copolymer in 1,2-dichloroethane is charged to a 4-liter jacketed, bottom drain reactor. The $T_g$ of the neat polymer is greater than 100° C. The reactor is equipped with an overhead stirrer, multi-blade agitator, thermowell, steam line, and a short-path distillation head that is equipped with a graduated, jacketed receiver, thermowell, and dry-ice condenser. The agitator is started and set to 350 RPM. Using steam injection, the reactor contents are warmed from 20 to 100° C. over 16 minutes. Solvent starts collecting in the receiver at 35° C. and the brominated polymer begins to precipitate after 6 minutes of processing time. The overhead temperature is allowed to approach 100° C. closely and the overheads are collected as two phases. The reactor head is then washed down with 297.8 g of water. The contents in the reactor are then cooled to ambient temperature over 30 minutes using a re-circulating chiller bath. The solids are then drained out of the reactor and vacuum-filtered through a coarse sintered glass filter funnel. The solids filter as quickly as the slurry is poured into the funnel. The wetcake is washed with 111.3 g of water and allowed to pull down on the vacuum filter for 30 minutes. The brominated polymer wetcake (77.2 g) is transferred to a drying container and vacuum dried at 62° C. until a constant weight of 26.5 g is reached. Overall drying time is 26 hours. The recovered brominated polymer is an off-white, flowable solid. The product brominated butadiene polymer has a 5% weight loss temperature of 258° C. It contains 9 ppm of free bromide and 6.3 ppm of sulfates.

EXAMPLE 2

1047.4 g of water is charged to a 4-liter jacketed, bottom drain reactor equipped with an overhead stirrer, multi-blade agitator, thermowell, steam line and a short-path distillation head that is equipped with a graduated, jacketed receiver, thermowell, and dry-ice condenser. The agitator is started at a speed of 350 RPM. Steam is injected into the water sub-surface, and the water is heated from 20 to 100° C. over 10 minutes. 250.4 of a 10% solution of a brominated styrene/butadiene/styrene copolymer ($T_g$>100° C.) in 1,2-dichloroethane is loaded to the reactor sub-surface through a nozzle at 21 to 25 MPa pressure over 13 minutes. Solvent is collected overhead as soon as the addition starts. Solids are seen forming within a few minutes of the addition and the overheads temperature drops from 100 to 98° C. during the addition. After the addition is complete, the feed line is flushed with 10 g of 1,2-dichloroethane and steam injection is continued until the overhead temperature rises to 99° C. The steam is shut down to the reactor and both the feed nozzle and steam line are removed from the reactor. The reactor is cooled to ambient temperature over 31 minutes using a re-circulating chiller bath. The solids are drained out of the reactor and vacuum-filtered through a coarse sintered glass filter funnel. The solids filter as quickly as the slurry is poured in the funnel. The wetcake is washed with 342.7 g of water and allowed to pull down on the vacuum filter for about 2 hours. The brominated polymer wetcake (61.5 g) is split into two portions. One portion is vacuum dried at 90° C. until a constant weight of 11.8 g is obtained. This dried polymer has a 5% weight loss temperature of 256° C. It contains 52 ppm free bromine and 4.6 ppm sulfates. The other portion is dried at and 56° C. to a constant weight of 12.1 g. This portion of the dried polymer has a 5% weight loss temperature of 256° C. It contains 52 ppm free bromide and 4.6 ppm sulfates.

EXAMPLE 3

1003.8 g of water is charged to a 4-liter jacketed, bottom drain reactor equipped with an overhead stirrer, multi-blade agitator, thermowell, steam line, and a short-path distillation head equipped with a graduated, jacketed receiver, thermowell, dry-ice condenser and a vacuum port. The agitator brought to a speed of 350 RPM. The heater/chiller bath is set to 30° C. and fluid re-circulated through the reactor jacket. The reactor is placed under 156 mm Hg vacuum and steam is injected sub-surface. The water is heated from 20 to 60° C. over 2 minutes and then held at 60° C. 253.5 g of a 10% solution of a brominated styrene/butadiene/styrene copolymer ($T_g$>100° C.) in 1,2-dichloroethane is loaded to the reactor sub-surface through a nozzle at 26 to 29.8 MPa pressure over 11 minutes. Solvent is collected overhead at 58-61° C. during the addition, and solids are seen forming within a few minutes of the addition. After the addition is complete the feed line is flushed with 10 g of 1,2-dichloroethane and the overhead temperature allowed to reach 61° C. The steam is shut down to the reactor and vacuum in the reactor is relieved to atmospheric pressure. The feed nozzle and steam line are removed from the reactor, the agitation speed reduced to 250 RPM and the reactor allowed to cool to ambient temperature overnight. The solids are drained out of the reactor and vacuum-filtered through a coarse sintered glass filter funnel. The solids filter as quickly as the slurry is poured in the funnel. The wetcake is washed with 307.3 g of water and allowed to pull down on the vacuum filter for about 2 hours. The brominated polymer wetcake (61.5 g) is split into two portions. One portion is vacuum dried at 90° C. until a constant weight of 11.8 g is obtained. This dried polymer has a 5% weight loss temperature of 256° C. It contains 22 ppm free bromine and 19 ppm sulfates. The other portion is dried at and 56° C. to a constant weight of 12.1 g. This portion of the dried polymer has a 5% weight loss temperature of 256° C. It contains 16 ppm free bromide and 25 ppm sulfates.

EXAMPLE 4

8.6 g of polystyrene polymer is charged to a stirred vessel containing 200 g of a 10% solution of a brominated styrene/butadiene/styrene copolymer ($T_g$>100° C.) in 1,2-dichloroethane. The slurry is allowed to stir at ambient temperature until the polystyrene polymer dissolves. The resulting solution contains the brominated butadiene polymer and polystyrene at a 70/30 weight ratio.

106.6 g of water is charged, to a 4-liter jacketed, bottom drain reactor equipped with an overhead stirrer, multi-blade agitator, thermowell, steam line and short-path distillation head equipped with a graduated, jacketed receiver, thermowell, and dry-ice condenser. The agitator is set to a speed of 350 RPM. Steam is injected sub-surface, and the water is heated from 20 to 100° C. over 5 minutes. 70.0 g of the polymer solution described above is loaded to the reactor sub-surface through a nozzle at 10.3 to 12.6 MPa pressure over 5 minutes. Solvent is collected overhead as soon as the addition starts. Solids are seen forming within a few minutes of the addition and the overheads temperature drops from 100 to 96° C. during the addition. After the addition is complete the feed line is flushed with 12.6 g of 1,2-dichloroethane and the overhead temperature allowed to reach 99° C. The steam feed is shut down and both the feed nozzle and steam line are removed from the reactor. The headspace of the reactor is washed with 206.4 g of water to rinse down solids and the reactor is cooled to ambient temperature over 3-4 hours using a re-circulating chiller bath. The solids are drained out of the reactor and vacuum-filtered through a coarse sintered glass filter funnel. The solids filter as quickly as the slurry is poured in the funnel. The wetcake is washed with 275.5 g of water and allowed to pull down on the vacuum filter for 1 hour and 45 min. The wetcake (24.9 g) is transferred into a drying container and vacuum dried at for about 21 hours at 62° C. until a constant weight of 10.6 g is reached. The recovered polymer particles contain a blend of polystyrene and the brominated butadiene copolymer.

What is claimed is:

1. A process for recovering a brominated butadiene polymer from a crude reaction solution, comprising forming droplets of the solution in a nonsolvent liquid in which the brominated butadiene polymer is soluble to the extent of 5 parts by weight or less per 100 parts of the nonsolvent liquid, heating the droplets to a temperature of at least the boiling temperature of the solvent at the operating pressure or, if the solvent forms an azeotrope with the nonsolvent liquid, to at least the boiling temperature of the azeotrope at the operating pressure, to remove solvent whereby the brominated butadiene polymer precipitates from the solution to form a dispersion of particles of the brominated butadiene polymer in the nonsolvent liquid, and then removing the brominated butadiene polymer particles from the nonsolvent liquid.

2. A process for recovering a brominated butadiene polymer from a crude reaction solution, comprising (1) forming the solution into fine droplets, (2) thermally stripping the solvent from the droplets whereby the brominated butadiene polymer precipitates from the solution to form particles of the brominated butadiene polymer, (3) washing said particles in a nonsolvent liquid in which the brominated butadiene polymer is soluble to the extent of 5 parts by weight or less per 100 parts of the nonsolvent liquid and then (4) separating the particles from the nonsolvent liquid, wherein step (2) is performed by heating the droplets to a temperature of at least the boiling temperature of the solvent at the operating pressure or, if the solvent forms an azeotrope with the nonsolvent liquid and the solvent is removed when the droplets are dispersed in the non-solvent liquid, to at least the boiling temperature of the azeotrope at the operating pressure.

3. The process of claim 2, wherein the droplets are formed in the nonsolvent liquid.

4. The process of claim 3, wherein the nonsolvent liquid is aqueous.

5. The process of claim 4, wherein step (2) is performed by heating the droplets with steam they are dispersed in the nonsolvent liquid.

6. The process of claim 5 wherein the nonsolvent liquid is water.

7. The process of claim 2 wherein the brominated butadiene polymer solution contains one or more additives that are insoluble in the nonsolvent liquid and the brominated butadiene polymer particles contain the additive.

8. The process of claim 2 wherein the droplets are dispersed into a gaseous medium.

9. The process of claim 8 wherein solvent is removed from the droplets to form brominated butadiene particles, and the brominated butadiene particles are then contacted with the nonsolvent liquid.

10. The process of claim 9, wherein steam and the crude reaction solution are dispensed through one or more nozzles such that droplets of the butadiene polymer solution are formed and solvent is removed from the droplets to form brominated butadiene polymer particles.

11. The process of claim 10 wherein additional low velocity steam is dispensed so as to shroud the nozzle or nozzle and provide additional thermal energy to the droplets.

12. The process of claim 11 wherein the particle size distribution of the droplets is controlled by specifying the relative rates at which the steam, shroud gas and crude reaction solution are dispensed.

13. The process of claim 8 wherein the droplets are dispersed into the nonsolvent liquid, and solvent is removed from the droplets to form brominated butadiene particles while the droplets are dispersed in the nonsolvent liquid.

14. The process of claim 8 wherein the nonsolvent liquid is water.

15. The process of claim 8 wherein the brominated butadiene polymer solution contains one or more additives that are insoluble in the nonsolvent liquid and the brominated butadiene polymer particles contain the additive.

\* \* \* \* \*